US008979398B2

(12) United States Patent
Han et al.

(10) Patent No.: US 8,979,398 B2
(45) Date of Patent: Mar. 17, 2015

(54) WEARABLE CAMERA

(71) Applicant: Microsoft Corporation, Redmond, WA (US)

(72) Inventors: Amy Aimei Han, Portola Valley, CA (US); Jason Williams, Santa Clara, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 13/863,998

(22) Filed: Apr. 16, 2013

(65) Prior Publication Data

US 2014/0308031 A1    Oct. 16, 2014

(51) Int. Cl.
*G03B 17/00*    (2006.01)
*G03B 17/56*    (2006.01)

(52) U.S. Cl.
CPC .................. *G03B 17/561* (2013.01)
USPC ........................................... 396/424

(58) Field of Classification Search
CPC ..................................... G03B 17/561
USPC ........................................... 396/424
See application file for complete search history.

(56) References Cited

U.S. PATENT DOCUMENTS

| 3,305,148 A | 2/1967 | Zimmerman |
| 5,282,044 A | 1/1994 | Misawa et al. |
| 6,058,141 A | 5/2000 | Barger et al. |
| 6,168,057 B1 | 1/2001 | Schwabe |
| 6,252,389 B1 | 6/2001 | Baba et al. |
| 6,275,829 B1 | 8/2001 | Angiulo et al. |
| 6,561,702 B1 | 5/2003 | Yik |
| 6,612,404 B2 | 9/2003 | Sweet et al. |
| D483,784 S * | 12/2003 | Ting .............................. D16/208 |
| 6,667,771 B1 * | 12/2003 | Kweon ......................... 348/373 |
| 6,680,748 B1 | 1/2004 | Monti |
| 6,727,949 B1 | 4/2004 | Saruwatari et al. |
| 6,757,027 B1 | 6/2004 | Edwards et al. |
| 6,867,680 B1 | 3/2005 | Kulle |
| 7,012,621 B2 | 3/2006 | Crosby et al. |
| 7,092,614 B2 | 8/2006 | Liebhold et al. |
| D534,939 S * | 1/2007 | Sheehan et al. .............. D16/208 |

(Continued)

FOREIGN PATENT DOCUMENTS

| CN | 202838971 | 3/2013 |
| EP | 0985899 | 3/2000 |

(Continued)

OTHER PUBLICATIONS

"DVR003 Mini Camera Stick HD Mini Camera and Video Recorder", Retrieved from <http://www.spyville.com/dvr003-lawmate-camstick.html> on Apr. 16, 2013, (2013), 2 pages.

(Continued)

*Primary Examiner* — Rodney Fuller
(74) *Attorney, Agent, or Firm* — Sonia Cooper; Jim Ross; Micky Minhas

(57) ABSTRACT

A garment clip is disclosed. The garment clip houses a camera and comprising a first portion housing operational circuitry and a second portion supporting an image capture component. The second portion has a mass which is less than the first portion. The first and second portions are connected in a configuration such that, when the clip is secured to the garment, the image capture component faces outwardly and the first portion is at least partially concealed by the garment.

20 Claims, 8 Drawing Sheets

(56) References Cited

U.S. PATENT DOCUMENTS

| | | | |
|---|---|---|---|
| 7,326,869 B2 | 2/2008 | Flynn et al. | |
| 7,454,711 B2 | 11/2008 | Angiulo et al. | |
| 7,490,721 B2 | 2/2009 | Bishop | |
| 7,574,129 B2 | 8/2009 | Tsukuda | |
| 7,623,182 B2 | 11/2009 | Byrne et al. | |
| 7,778,023 B1 | 8/2010 | Mohoney | |
| 7,783,133 B2 | 8/2010 | Dunki-Jacobs et al. | |
| 8,031,255 B2 | 10/2011 | Usami | |
| 8,159,363 B2 | 4/2012 | Song | |
| 8,159,541 B2 | 4/2012 | McLeod | |
| 8,270,827 B2 | 9/2012 | Tse, Jr. | |
| 8,322,215 B2 | 12/2012 | Lakich et al. | |
| 8,330,854 B2 | 12/2012 | Kossin | |
| 8,355,619 B2 | 1/2013 | Kato et al. | |
| 8,363,121 B2 | 1/2013 | Maeng | |
| 8,374,498 B2 | 2/2013 | Pastore | |
| 8,514,292 B2 | 8/2013 | Cho | |
| 8,515,241 B2 | 8/2013 | Forsyth et al. | |
| 8,538,376 B2 | 9/2013 | Lee et al. | |
| 8,587,670 B2 | 11/2013 | Wood et al. | |
| 8,605,188 B2 | 12/2013 | Ishihara et al. | |
| 2002/0140849 A1 | 10/2002 | Slatter et al. | |
| 2002/0186317 A1 | 12/2002 | Kayanuma | |
| 2003/0081121 A1 | 5/2003 | Kirmuss | |
| 2003/0234860 A1 | 12/2003 | Sung et al. | |
| 2004/0056949 A1* | 3/2004 | Lin | 348/61 |
| 2004/0105024 A1 | 6/2004 | Takahashi | |
| 2004/0183912 A1 | 9/2004 | Szolyga et al. | |
| 2004/0240005 A1 | 12/2004 | Kim | |
| 2005/0093988 A1 | 5/2005 | Haas et al. | |
| 2005/0140798 A1 | 6/2005 | Tashiro et al. | |
| 2005/0248453 A1 | 11/2005 | Fechter | |
| 2006/0066753 A1 | 3/2006 | Gennetten et al. | |
| 2006/0078215 A1 | 4/2006 | Gallagher | |
| 2006/0165160 A1 | 7/2006 | Winningstad et al. | |
| 2006/0197843 A1 | 9/2006 | Yoshimatsu | |
| 2006/0268162 A1 | 11/2006 | Kayanuma | |
| 2007/0071423 A1 | 3/2007 | Fantone et al. | |
| 2007/0214886 A1 | 9/2007 | Sheynblat | |
| 2008/0136940 A1 | 6/2008 | Srikanth et al. | |
| 2008/0165249 A1 | 7/2008 | DeKeyser | |
| 2008/0180537 A1 | 7/2008 | Weinberg et al. | |
| 2008/0259174 A1 | 10/2008 | Nagao | |
| 2008/0260291 A1 | 10/2008 | Alakarhu et al. | |
| 2009/0117946 A1 | 5/2009 | Tomasini et al. | |
| 2010/0026839 A1 | 2/2010 | Border et al. | |
| 2010/0027663 A1 | 2/2010 | Dai et al. | |
| 2010/0053348 A1 | 3/2010 | Yoshimoto et al. | |
| 2010/0079356 A1 | 4/2010 | Hoellwarth | |
| 2010/0107126 A1 | 4/2010 | Lin et al. | |
| 2010/0118158 A1 | 5/2010 | Boland et al. | |
| 2010/0175088 A1 | 7/2010 | Loebig et al. | |
| 2010/0194682 A1 | 8/2010 | Orr et al. | |
| 2010/0306402 A1 | 12/2010 | Russell et al. | |
| 2010/0316369 A1 | 12/2010 | Pyle | |
| 2011/0064129 A1 | 3/2011 | Bennett et al. | |
| 2011/0070829 A1 | 3/2011 | Griffin et al. | |
| 2011/0084661 A1 | 4/2011 | Saw | |
| 2011/0149094 A1 | 6/2011 | Chen et al. | |
| 2011/0211061 A1 | 9/2011 | Kossin | |
| 2012/0063736 A1 | 3/2012 | Simmons et al. | |
| 2012/0086819 A1 | 4/2012 | Wilson et al. | |
| 2012/0140093 A1 | 6/2012 | Chuang | |
| 2012/0290840 A1 | 11/2012 | Willins | |
| 2012/0297334 A1 | 11/2012 | Fagans et al. | |
| 2013/0014585 A1 | 1/2013 | Hetherington | |
| 2013/0057489 A1 | 3/2013 | Morton et al. | |
| 2013/0069985 A1 | 3/2013 | Wong et al. | |
| 2013/0201344 A1 | 8/2013 | Sweet et al. | |
| 2013/0229562 A1 | 9/2013 | Kamada et al. | |
| 2013/0239001 A1 | 9/2013 | Maloney et al. | |
| 2014/0071091 A1 | 3/2014 | Barak et al. | |
| 2014/0211031 A1 | 7/2014 | Han | |
| 2014/0270688 A1 | 9/2014 | Han | |
| 2014/0270689 A1 | 9/2014 | Chau | |
| 2014/0333828 A1 | 11/2014 | Han et al. | |
| 2014/0354880 A1 | 12/2014 | Han | |

FOREIGN PATENT DOCUMENTS

| | | |
|---|---|---|
| EP | 1571634 | 9/2005 |
| EP | 2091247 | 8/2009 |
| EP | 2160019 | 3/2010 |
| GB | 2456587 | 7/2009 |
| JP | 2006129391 | 5/2006 |
| JP | 2009110351 | 5/2009 |

OTHER PUBLICATIONS

"GeniusGaurd™ Pen Spy Camera Recorder Model S3K", Retrieved from <http://www.eurekaplus.com/pen-spycam-recorder-s3k.html> on Apr. 16, 2013, 5 pages.

"Hi-Res "Pen Cap" Pocket Wearable Spy Camera", Retrieved from <https://www.dynaspy.com/hi-res-pen-cap-pocket-spy-camera-4gb-sd-memory> on Apr. 16, 2013, (2013), 3 pages.

"Spy Mini DVR HDMI Camera", Retrieved from <http://www.balajitech.in/spy-camera.html> on Apr. 16, 2013, 28 pages.

"Canon VIXIA HF R200 Full HD Camcorder with Dual SDXC Card", Retrieved from <http://www.amazon.com/Canon-VIXIA-R200-Camcorder-Slots/dp/B004HW7EAG> on Mar. 20, 2013, 9 pages.

"Canon: Ease of Use", Retrieved from: <http://www.usa.canon.com/cusa/consumer/standard_display/PS_Advantage_Ease> on Feb. 11, 2014, Mar. 12, 2011, 17 pages.

"Hall Effect Proximity Sensors Information", Retrieved from <http://www.globalspec.com/learnmore/sensors_transducers_detectors/proximity_presence_sensing/hall_effect_proximity_sensors> on Mar. 21, 2013, Aug. 31, 2012, 3 pages.

"Hall Effect Pushbutton Switches", Retrieved from <http://www.ottoexcellence.com/file.aspx?Fileld=3337> on Mar. 20, 2013, 1 page.

"Hall Effect Sensor—SparkFun Electronics", Retrieved from <https://www.sparkfun.com/products/9312> on Mar. 21, 2013, Jan. 24, 2013, 7 pages.

"International Search Report and Written Opinion", Application No. PCT/US2014/022896, Jun. 16, 2014, 13 Pages.

"International Search Report and Written Opinion", Application No. PCT/US2014/037406, Aug. 4, 2014, 13 Pages.

"International Search Report and Written Opinion", Application No. PCT/US2014/022892, Jul. 1, 2014, 14 Pages.

"International Search Report and Written Opinion", Application No. PCT/US2013/013648, Apr. 11, 2014, 9 pages.

"Kodak Easyshare LS443 Zoom Digital Camera—User's Guide", Retrieved from <http://resources.kodak.com/support/shtml/en/manuals/urg00024/urg00024c8s1.shtml> on Mar. 20, 2013, 2 pages.

"Memoto Lifelogging Camera", Retrieved from <http://www.kickstarter.com/projects/martinkallstrom/memoto-lifelogging-camera/> on Mar. 13, 2013, Oct. 23, 2012, 24 pages.

"Non-Final Office Action", U.S. Appl. No. 13/754,719, Jul. 9, 2014, 15 pages.

"Non-Final Office Action", U.S. Appl. No. 13/828,139, Aug. 7, 2014, 20 pages.

"Non-Final Office Action", U.S. Appl. No. 13/871,905, May 15, 2014, 7 pages.

"Non-Final Office Action", Application No. 13/873,069, Jul. 25, 2014, 17 pages.

"'Panasonic V10 Camcorder Black'—Overview", Retrieved from <http://dicksmith.com.au/product/XG1221/?utm_medium=lasoo&utm_campaign=catalogue&utm_source=XG1221> on Mar. 20, 2013, 3 pages.

"Tap Detection", Retrieved from <http://www.kionix.com/tap-detection> on Mar. 19, 2013, Oct. 5, 2012, 1 page.

"TouchOSC", Retrieved from <http://hexler.net/docs/touchosc-configuration-options> on Mar. 19, 2013, May 26, 2011, 4 Pages.

"User Guide Jawbone Era", Retrieved from <http://content.jawbone.com/static/www/pdf/manuals/era/jawbone-era-manual.pdf> on Mar. 18, 2013, 2010, 16 pages.

(56) References Cited

OTHER PUBLICATIONS

"Using Vicon Revue", Retrieved from <https://www.viconrevue.com/faqs/documents/UsingViconRevuev10_final.pdf> on Apr. 30, 2013, 2010, 41 pages.

Boyle, "Smartphone Accelerometers Could Be Used to Eavesdrop on Nearby Devices", Retrieved from <http://www.popsci.com/technology/article/2011-10/smartphones-could-become-spyphones-using-accelerometer-keystroke-detection> on Mar. 25, 2013, Oct. 19, 2011, 2 pages.

Chua, "Shock and Mute Pager Applications Using Accelerometers", Freescale Senliconductor, Inc., Rev. J, Oct. 2006, 8 pages.

Gallagher, "Using Vanishing Points to Correct Camera Rotation in Images", In 2nd Canadian Conference on Computer and Robot Vision, May 9, 2005, 8 pages.

Hodges, et al.,' "SenseCam: A Wearable Camera which Stimulates and Rehabilitates Autobiographical Memory", In Memory, vol. 19, No. 7, Available at <http://research.microsoft.com/en-us/um/cambridge/projects/sensecam/pdf_files/memory.pdf>,Oct. 2011, 18 pages.

Jacobowitz, "Olympus Stylus 1050 SW", Retrieved from <http://www.pcmag.com/article2/0,2817,2333989,00.asp> on Mar. 21, 2013, Nov. 5, 2008, 6 pages.

Kaur, et al.,' "A Combined DWT-DCT approach to perform Video compression base of Frame Redundancy", In Proceedings: International Journal of Advanced Research in Computer Science and Software Engineering, vol. 2, Issue 9, M.M. University, Mullana (Ambala), Haryana, India,Sep. 2012, pp. 325-332.

Liu, et al.,' "uWave: Accelerometer-based Personalized Gesture Recognition and Its Applications", Pervasive and Mobile Computing, vol. 5, Issue 6, Available at <http://www.ruf.rice.edu/~mobile/publications/liu09percom.pdf>,Mar. 9, 2009, pp. 1-9.

Samadani, et al.,' "Representative Image Thumbnails: Automatic and Manual", In Proceeding of Human Vision and Electronic Imagaing XIII, Jan. 24, 2008, 13 pages.

Shiratori, et al.,' "Accelerometer-based User Interfaces for the Control of a Physically Simulated Character", Proceedings fothe First ACM SIGGRAPH Conference and Exhibition on Computer Graphics and Interactive Techniques in Asia, vol. 27, No. 5, Available at <http://graphics.cs.cmu.edu/progjects/wii/SIGGRAPHAsia2008_wii.pdf>, Dec. 10, 2008, 9 pages.

Terbush, "Looxcie 2 Review", Retrieved from <http://www.laptopmag.com/camcorders/looxcie-2.aspx> on Mar. 20, 2013, May 9, 2012, 3 pages.

Thammineni, et al.,' "Dynamic frame-rate selection for live lbr Video Encoders using trial frames", In Proceedings: IEEE International Conference on Multimedia and Expo, Ittiam Systems (Pvt.) Ltd., Bangalore, India,Jun. 23, 2008, pp. 817-820.

Tomkins, et al.,' "Nikon D3100", Retrieved from <http://www.imaging-resource.com/PRODS/D3100/D3100VIDEO.HTM> on Mar. 14, 2013, Dec. 13, 2010, 10 pages.

Wilt, "Review: Panasonic AG-AC160 and AG-HPX250 1/3"3-MOS Camcorders", Retrieved from <http://providecoalition.com/awilt/story/review_panasonic_ag-ac160_and_ag-hpx250_1_3_3-mos_camcorders/P1/> on Mar. 14, 2013, Jan. 23, 2012, 32 pages.

Zhang"Using Accelerometer in Windows 8* Metro Style App and a Case Study of Tap Detection", Intel Corporation, Available at <http://software.intel.com/sites/default/files/m/d/4/1/d/8/Accelerometer_Case_Study_Win8.pdf>,Jul. 11, 2012, 20 pages.

"Images of Nokia 6555 Mobile Phone", In: "Images of Nokia 6555 Mobile Phone", XP055143661, figures 1, 2, Oct. 1, 2014, 1 page.

"International Search Report and Written Opinion", Application No. PCT/US2014/040110, Aug. 14, 2014, 14 Pages.

"International Search Report and Written Opinion", Application No. PCT/US2014/034065, Oct. 13, 2014, 18 pages.

"Nokia 6555 User Guide", retrieved from https://web.archive.org/web/20101225182824/http://www.fido.ca/cms/pdf/en/userguides/Nokia6555_en.pdf on Oct. 29, 2014, Dec. 25, 2010, pp. 17, 61, 62.

"Non-Final Office Action", U.S. Appl. No. 13/892,085, Sep. 4, 2014, 19 pages.

Trumbo, "Samsung Flip Foldable", Retrieved from >http://www.concept-phones.comfsamsung/samsung-flip-foldable-phone-features-wrapscreen/, Jan. 9, 2012, 4 pages.

"Final Office Action", U.S. Appl. No. 13/873,069, Jan. 5, 2015, 20 pages.

\* cited by examiner

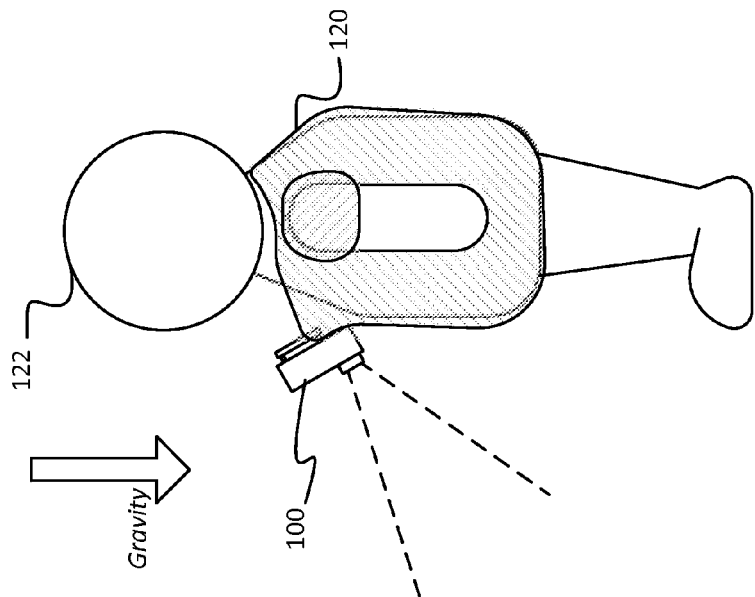
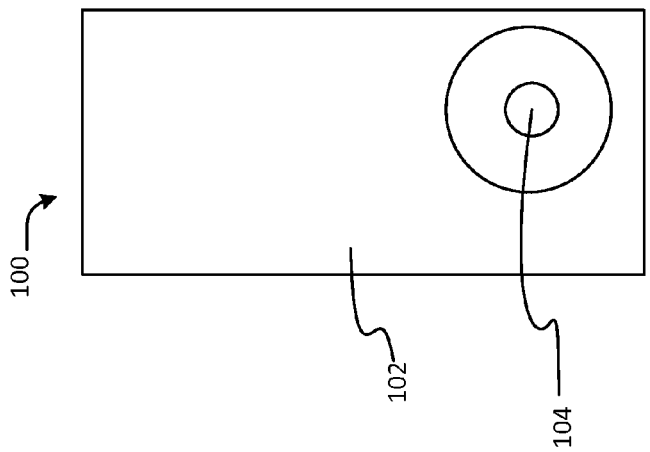
Figure 1c
Figure 1b
Figure 1a

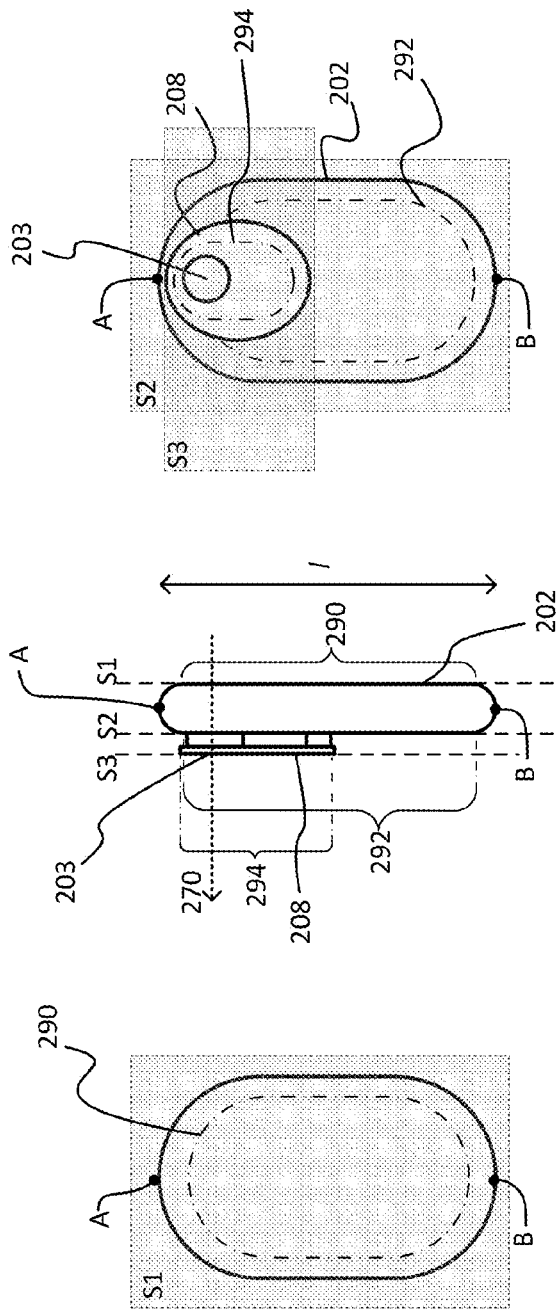

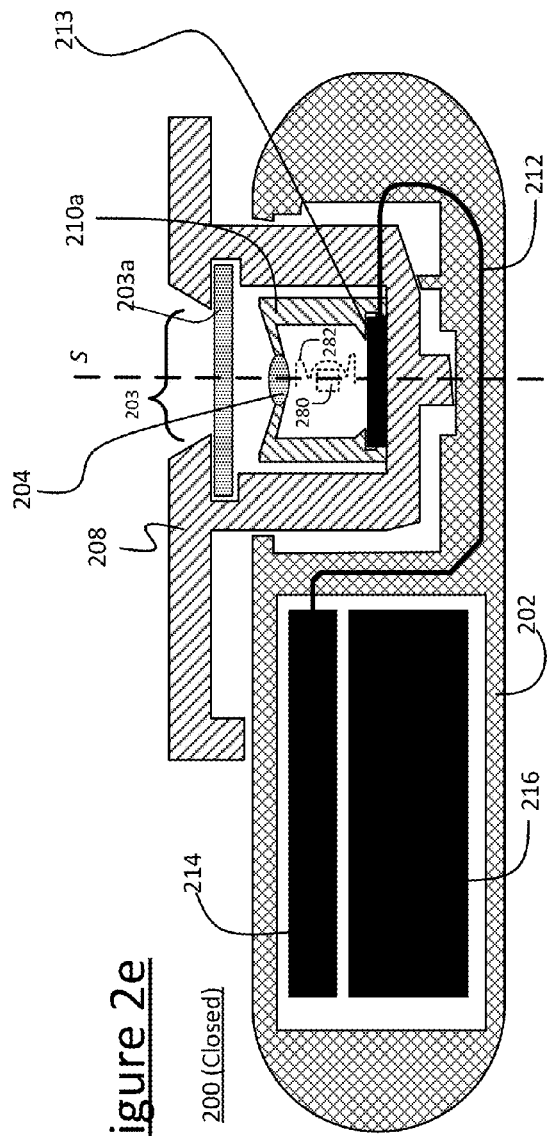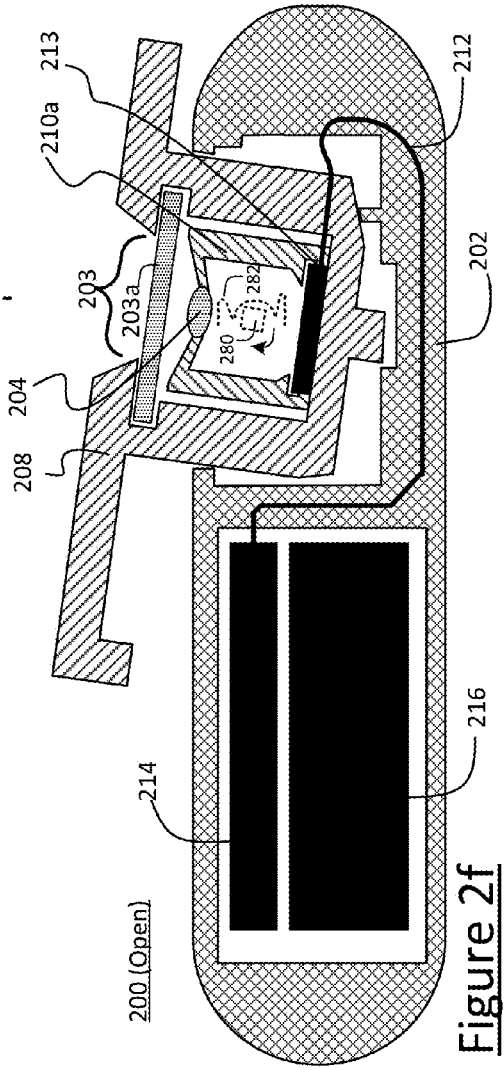
Figure 2e
200 (Closed)
Figure 2f
200 (Open)

WEARABLE CAMERA

BACKGROUND

Cameras may be used to capture an image or series of images constituting a video. In many situations, it is desirable for a user to be able to capture images "hands-free", including when the user is moving. That is, for the camera to capture an image or images (often of a scene in front of the user) even as the user moves, without the user having to hold the camera and possibly without the user having to manually operate the camera. One way in which this can be achieved is by way of a separate camera mount secured to a garment, or alternatively which is secured to the user.

Alternatively a "wearable camera" may be used such as wearable camera 100 shown in FIG. 1a (frontal-view) and FIG. 1b (side-view). Camera 100 includes a set of standard camera electrical components (not shown) grouped together and housed by outer casing 102. The outer casing may support an image capture component 104 for capturing an image. A clip 108 is attached to the back of the casing 102.

SUMMARY

The Summary is provided to introduce a selection of concepts in a simplified form that are further described below in the Detailed Description. This summary is not intended to identify key features or essential features of the claimed subject matter, nor is it intended to be used to limit the scope of the claimed subject matter.

One aspect provides a garment clip housing a camera. The clip comprises both a first portion, which houses operational circuitry of the camera, and a second portion, which supports an image capture component of the camera, with the image capture component being connected to the operational circuitry. The second portion of the clip has a mass which is less than the first portion of the clip, and the first and second portions are connected in a configuration so that, when the clip is secured to the garment, the image capture component faces outwardly and the first portion of the clip is at least partially concealed by the garment.

Another aspect provides a camera having a camera module housed in a clip portion of a garment clip. The camera module has a lens for capturing an image. The lens faces through an opening of the clip portion. The clip portion is pivotably mounted to a body portion which houses operational circuitry connected to the camera module.

BRIEF DESCRIPTION OF THE DRAWINGS

For an understanding of the described embodiments and to show how it may be carried into effect, reference is now made by way of example to the accompanying drawings in which:

FIG. 1a is a representation of a frontal-view of a known wearable camera;

FIG. 1b is a representation of a side-view of the known wearable camera of FIG. 1a;

FIG. 1c shows the known wearable camera of FIG. 1a secured to a garment worn by a user;

FIG. 2a shows an outer-view of the clip of FIG. 2 viewed from a back perspective;

FIG. 2b shows an outer-view of the clip of FIG. 2 viewed from a side perspective;

FIG. 2c shows an outer-view of the clip of FIG. 2 viewed from a front perspective;

FIG. 2e shows a more detailed representation a side view of the clip of FIG. 2 in a closed disposition;

FIG. 2f shows a more detailed representation of a side view the clip of FIG. 2e in an open disposition;

DETAILED DESCRIPTION

In the following description, numerous specific details are set forth to provide a more thorough understanding of the described embodiments. However, it will be appreciated that one or more of these specific details may be omitted in practice. In other instances, well-known features have not been described in order to avoid obfuscation.

In some cases, it may be desirable to take pictures or shoot video using a camera without having to hold the camera. One typical technology is a wearable camera such as that shown in FIGS. 1a (front-view) and 1b (side-view) which can be secured to a garment. Known wearable cameras have a tendency to tilt forward in the downward direction of the Earth's gravitational acceleration when secured to a garment: FIG. 1c shows the known camera 100 secured to a garment 120, worn by (for example) a user 122. As the camera 100 has a mass, the majority of which is outside the garment, an effect of the Earth's gravitational acceleration g is to tilt the camera 100 forward. That is, to rotate the camera 100 away from the user 120 in the downward direction of gravity, particularly when the garment is loose-fitting.

Disclosed herein is a garment clip housing a camera which is able to maintain desired orientations relative to gravity when secured to a garment. In other words, a camera is embodied as a garment clip.

The camera has a number of special features. The configuration is such that the camera faces through a clip portion, for example through a glass window. A camera lens/sensor module is integrated into the clip portion, with the rest of the electrical components behind the clip portion (housed in a body portion). The clip portion include features that mate with the camera body portion to provide greater attachment force to clothing. A clip point is designed at the centre of mass of the camera to avoid any tendency to rotate. The lens etc. can be recessed to prevent fingers from touching the lens when attaching the clip. The clip can include cosmetic front plates that can be swapped in and out to change the colour/appearance of the clip.

The clip portion may be forward of the body portion such that the camera has a centre of gravity behind the clip portion. That is, the camera may have a centre of gravity such that, when the camera is secured to a garment worn by (e.g.) a user with the body portion concealed by the garment, the centre of gravity may be between the user's body and the clip. This prevents the camera from tilting forward.

The camera may comprise a detachable front piece attached to, and covering, an outer surface of the clip portion, exposing the opening. The clip portion may overlie only a part of the body portion in a clip position, the body portion intended to be concealed by a garment when the camera is secured to the garment.

Embodiments will now be described with reference to FIG. 2.

Figure 2:
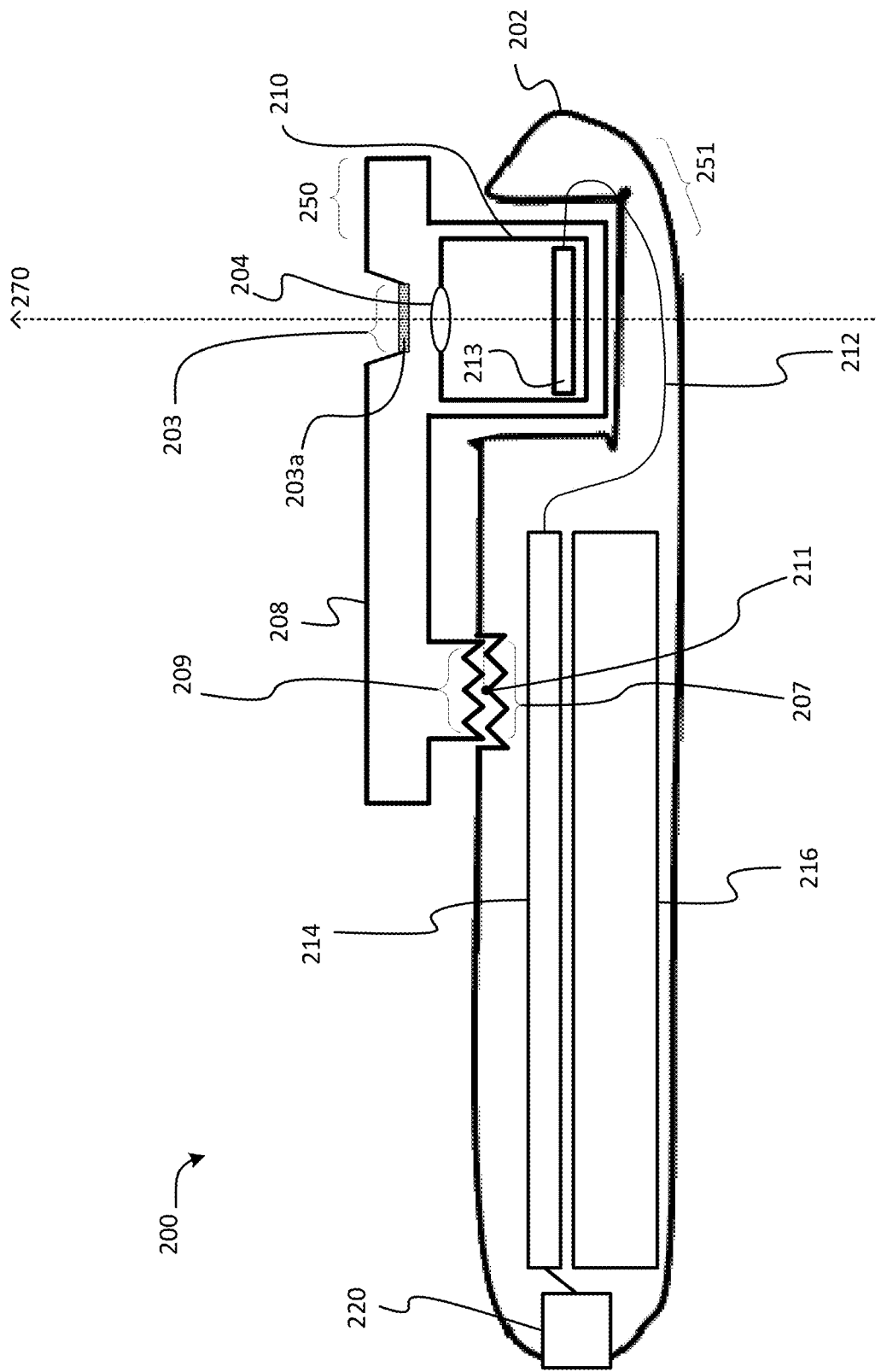
FIG. 2 is a representation of a garment clip housing a camera.

As shown in FIG. 2, garment clip 200 comprises a first (body) portion 202 housing operational circuitry 214 of the camera and a second (clip) portion 208 supporting an image capture component 210 of the camera. The image capture component may comprise at least one lens 204 and at least one sensor 213 for converting light into corresponding electrical signals. In embodiments, the sensor 213 may be a complementary metal-oxide-semiconductor (CMOS) sensor 205, although alternatives will apparent to the skilled person. The lens 204 forms part of an optical system having an optical axis 270. The second portion 208 has a mass which is less than the first portion 202. The lens 204 may be made of glass, although alternatives will be apparent. The sensor 213 may be connected to operational circuitry 214 via connector 212. Connector 212 may comprise a flexible Printed Circuit Board (PCB) although alternative types of connector will also be apparent. The first portion 202 additionally houses a battery 216 for supplying power to the camera. The first portion may support a port 220 which is connected to the operational circuitry 214.

Operational circuitry 214 such as a logic board may comprise processing circuitry (not shown) for processing electrical signals produced by the sensor of the image capture component 210 and a memory (not shown) for storing images and/or sequences of images constituting videos. Alternatively or additionally the camera may support a memory port (not shown) which enables the operational circuitry 214 to interface with a removable memory module such as a flash memory card.

Figure 3B:
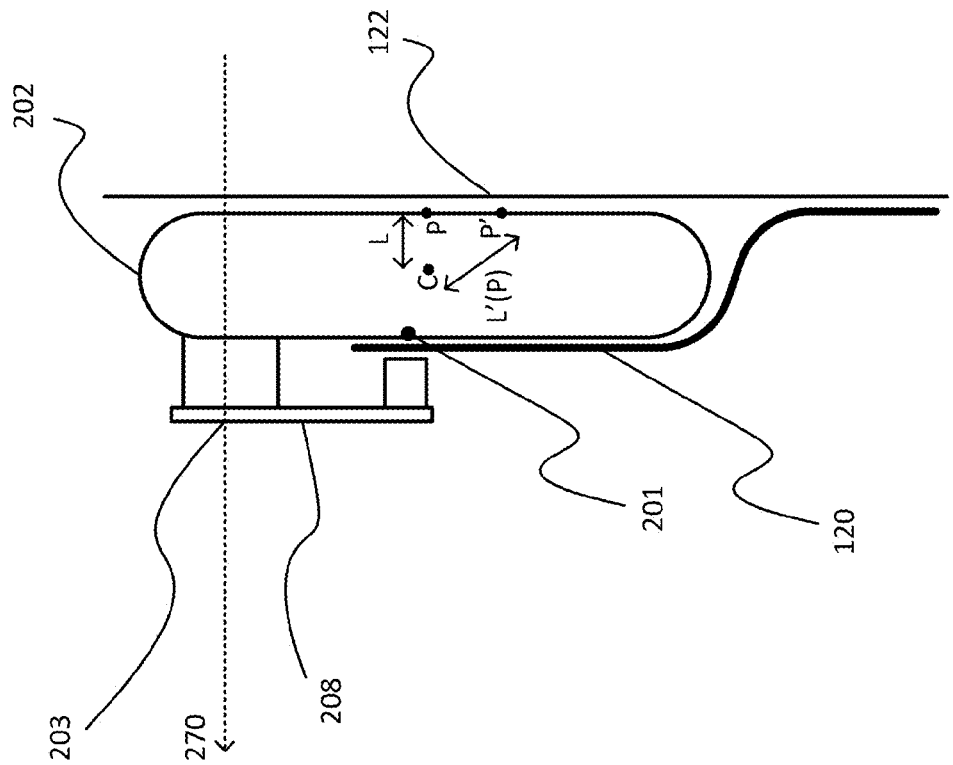
FIG. 3b shows a side-view of the garment clip of FIG. 2 secured to a garment.
Figure 3A:
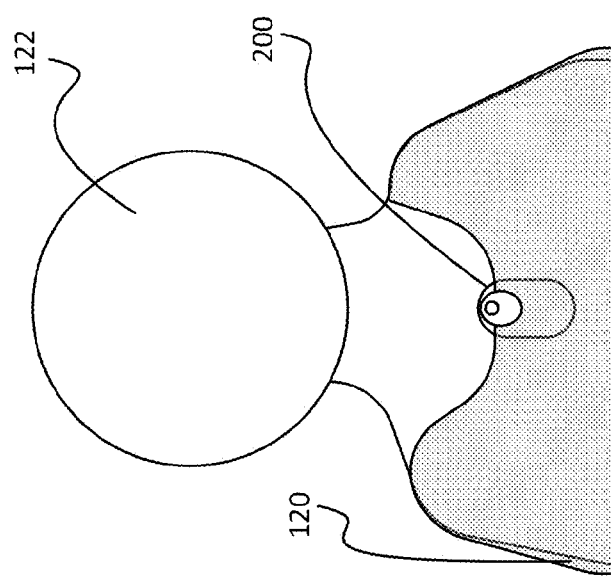
FIG. 3a shows a frontal-view of the garment clip of FIG. 2 secured to a garment.

As shown in FIG. 3a (front-view) and FIG. 3b (side-view), the first portion 202 and the second portion 208 are connected in a configuration such that the clip 200 may be secured to a garment 120 with the image capture component facing outwardly and with the first portion 202 at least partially concealed by the garment 120.

The clip 200 therefore has a centre of mass which is shifted away from the front of the camera, thereby reducing any tendency of the clip 200 to tilt forward when the camera is secured to a garment.

The second portion 208 may have transparent window 203. The transparent window 203 may be formed by an opening in the second portion 208, the opening optionally being covered by a transparent element 203a, such as a glass element, which is supported by the second portion 208, although alternatives will be envisaged. The second portion 208 may house the image capture component 210 with the image capture component 210 facing outwardly through the transparent window 203.

Figure 2D:
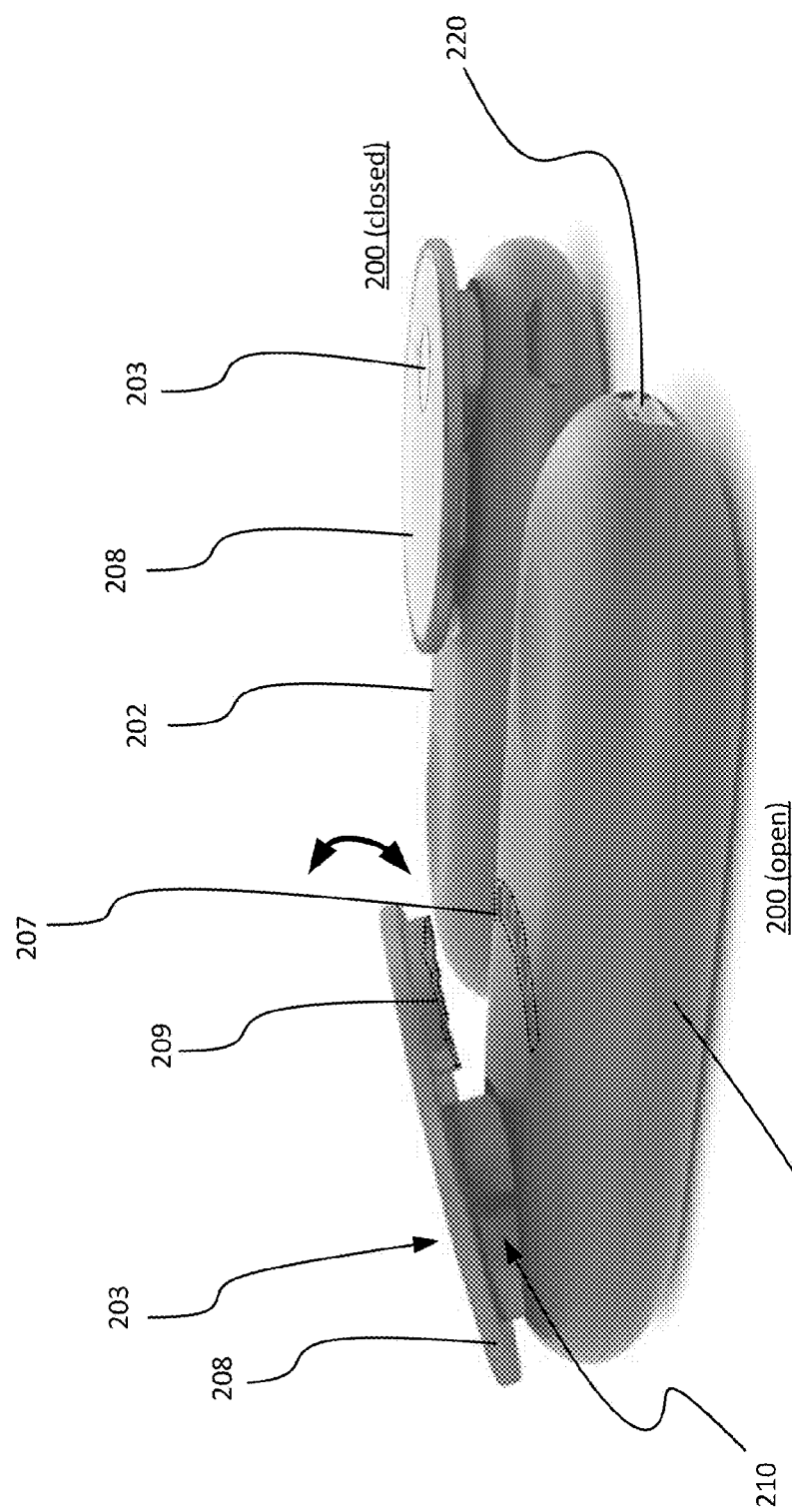
FIG. 2d shows the clip of FIG. 2 in both a closed and open state.

The first portion 202 and second portion 208 may be shaped having respective outer surfaces such that a second surface section 207 of the outer surface of the second portion 208 can be brought into contact with a first surface section 207 of the outer surface of the first portion 202, thereby closing the clip. For instance, the first and second portions may have shapes similar to those shown in FIG. 2d, which shows the clip 200 in both an open and a closed state.

The clip 200 has a clip point 211 on the outer surface of the first portion 202 at which a force but no torque is exerted on the first portion 202 by the second portion 208 due to pressure exerted on the first surface section 207 by the second surface section 209 when the clip is closed. In embodiments, the first surface section 207 may have a geometric centre which coincides with or which is at least near to the clip-point 211.

The clip 200 has a centre of mass 201 at which any resultant torque due to gravity on the clip 200 is zero. When clip 200 is secured to a garment worn (e.g.) by a user, the centre of mass 201 may be located between the second portion and the user's body to prevent tilting.

In embodiments, the centre of mass 201 may be located in the vicinity of, or near, the clip point 211. That is, the centre of mass 201 and the clip-point 211 may be separated by a distance having a magnitude which is small in comparison to a characteristic length which defines an appropriate scale of the clip 200.

The inventors have found that, if there is a resultant torque caused by the centre of mass being too far away from the clip point 211, the optical axis will be rotated away from a direction perpendicular to gravity.

As illustrated in FIG. 3b, in some embodiments, for a clip 200 comprising a first portion 202 having a geometric centre C, the characteristic length L may be suitably defined in relation to a point P on the outer surface of the first portion having a separation L from C, wherein P is such that, for all points Q on the outer surface of the first portion 202 having a separation L(Q) from C, L is the less than or equal to L(Q) (shown in FIG. 3b). However, it will be appreciated that garment clips in accordance with the present invention are envisaged as having different possible shapes and configurations. For a clip 200 having a particular shape and configuration (as well as other physical characteristics), alternative or additional definitions of the characteristic length may be suitable. These would be apparent to the skilled person.

The centre of mass may be as close to the clip point 211 as possible. However, it will again be appreciated that factors such as the shape and configuration of the clip 200, as well as other factors such as clip size, clamping area (i.e. the size of the first and second portions), and mass, as well as other normal design factors are likely to affect how close the centre of mass 201 has to be to the clip point 211 in order for the optical axis 270 to remain substantially perpendicular to gravity when the clip 200 is secured to a garment. For a clip 200 having a particular shape and configuration, the skilled person would be able to determine how close the centre of mass 201 has to be to the clip point 211 by way of normal design practice.

In embodiments, the clip 200 may have an outer surface as illustrated in FIGS. 2a-2c, or an outer surface similar thereto.

In embodiments, the first portion 202 may have a volume which is larger than the second portion 208.

In embodiments, the first portion 202 may have a surface area which is larger than the second portion 208.

In embodiments, as shown in FIGS. 2a and 2b, the first portion 202 may have an outer surface having at least a first substantially flat surface section 290 which lies in a first plane S1.

As used herein, a "substantially flat surface section" is a surface section having a curvature which is substantially zero when spatially averaged over the substantially flat surface section. Of course, this does not preclude there being localized non-zero curvature at various points on the substantially flat surface section, provided the spatial average across all points on the substantially flat surface section is nevertheless substantially zero.

The first plane S1 may be substantially perpendicular to the optical axis 270. The image capture component 210 has a centre and the first plane may be located a perpendicular distance X from the window 203 such that, for all points Q on the outer surface of the first portion 202 having a separation X(Q) from the window 203, X(Q) has a component along the optical axis 207 less than or equal to X. This helps to ensure that, when the clip 200 is secured to a garment 120 worn by (for example) user 122, the clip sits with the first substantially flat surface section 290 up against the user 122, thus stabilizing the clip 200 and helping to ensure that the optical axis 270 remains substantially perpendicular to gravity.

In embodiments, as shown in FIGS. 2b and 2c, the outer surface of the first portion 202 may have at least a second substantially flat surface section 292 which lies in a second plane S2, the second plane being substantially parallel to the first plane and having a separation w from the first plane. In some of these embodiments, the second portion may have a length l in a direction perpendicular to the first plane which is larger than the separation w, the length l being defined in relation to a point A and a point B on the outer surface of the first portion, A and B having a separation l, wherein A and B are such that, for all points A' and B' on the outer surface of the first portion, A' and B' having a separation l'(A',B'), l is greater than or equal to l'(A',B'). In the embodiments, the length l may be substantially larger than the width w.

In embodiments, the centre of mass 201 and the clip-point 211 may be separated by a distance having a magnitude which is substantially less than the width w.

Alternatively or additionally, as shown in FIGS. 2b and 2c, the second portion 208 may have an outer surface having at least a third substantially flat surface section 294 which lies in a third plane S3, S3 being substantially parallel to the first plane S1.

The second portion 208 may comprise attachment means for supporting a detachable front-plate (not shown), separate from the second portion 208—with the image capture component facing outwardly through the front-plate, thereby allowing different front-plates to be attached to the front of the second portion 208. When attached, the front-plate may lie substantially in the third plane S3. This allows front plates of different colours/designs to be attached to match what a user is wearing for example. A user-detachable front-plate may, for instance, be held into the second portion 208 with magnets.

Figure 4:
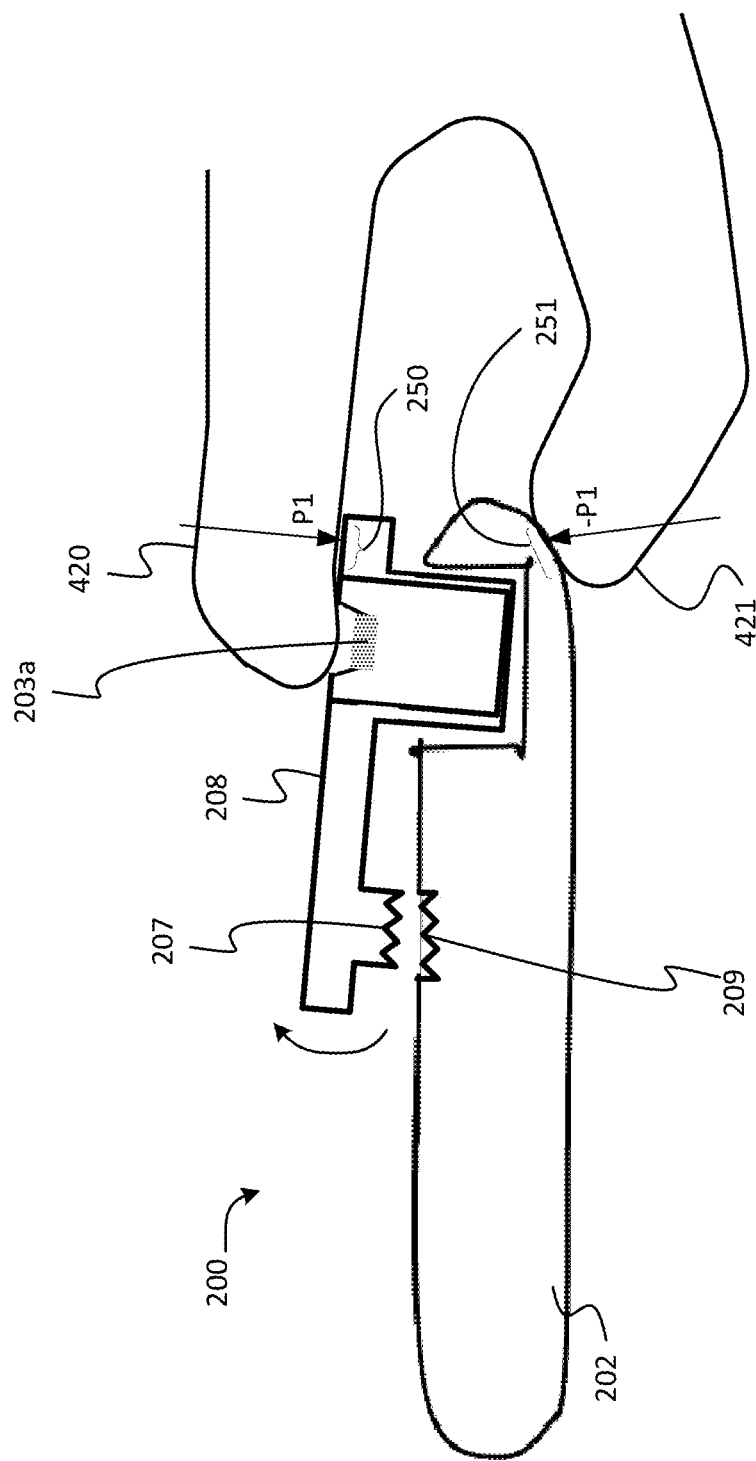
FIG. 4 illustrates a way in which the garment clip of FIG. 2 may be opened.

In embodiments, the first portion 202 may be connected to the second portion 208 such that the clip 208 can be opened as shown in FIG. 4. That is, such that the second portion 208 can be rotated towards and/or away from the first portion 202 from an initial orientation relative to the first portion 202 about (clockwise when the clip 200 is viewed as in FIGS. 2 and 5), for instance, by inwardly applying an external pressure P1 to an area 250 of the first portion 202 and by simultaneously applying an opposing external pressure –P1 to an area 251 of the second portion 250, thereby opening the clip. The pressures P1 and –P1 may, for instance, be provided by a finger 420 and thumb 421 of user 122. As will be appreciated, area 250 and area 251 are exemplary and the clip may also be opened by applying pressure to other suitable areas of the first and second portions respectively.

As used herein, the terms "internal pressure" and "external pressure" are relative to a mechanical system which includes only the garment clip 200. That is, an "external pressure" is a pressure applied to the garment clip by some entity which is not part of said mechanical system, whereas an "internal pressure" is a pressure applied to the garment clip by some other entity which is part of said mechanical system.

In embodiments, the transparent element 203a may be recessed. That is, the transparent element 203a may be set back into the second portion 208 by a distance which is sufficient to ensure that, when the user 122 opens the clip 200 as described above, their finger 420 does not touch the transparent element 203. In the case where the transparent window is an uncovered opening, the lens 204 itself may be set back into the second portion 208 by a distance which is sufficient to ensure that, when the user 122 opens the clip 200 as described above, their finger 420 does not touch the lens 204. This ensures that dirt, grease etc. are not transferred from the user's finger 420 to the transparent window 203 (or to the lens 204 if the window is uncovered) when the user opens the clip.

The first portion 202 and the second portion 208 may be connected such that an internal pressure is applied to the first portion 202 and such that an opposing internal pressure is simultaneously applied to the second portion 208. The internal pressure and the opposing internal pressure are directed so as to restore contact between the first surface section and the second surface section when the external pressure and opposing external pressure are removed, thereby closing the clip. The internal pressure and opposing internal pressure may have a magnitude which is sufficient to prevent the clip from opening due to any gravitational torques exerted on the first portion 202 and/or any gravitational torques exerted on the second portion 208 when the clip 200 is held at any orientation relative to the direction of gravity.

FIGS. 2e and 2f show a garment clip 200 in different dispositions. Specifically, FIG. 2e shows the clip 200 in a closed position and FIG. 2f shows the clip 200 in an open position. The second portion 208 has an inwardly extending connection part housing lens 204, sensor 213 and an inner casing portion 210a such that lens 204 faces outwardly through the transparent window 203. The connecting part is received by a receiving component of the first portion 202 such that the connecting part is capable of pivoting movement about a pivot location to alter the disposition of the clip between an open and closed position.

Figure 2G:
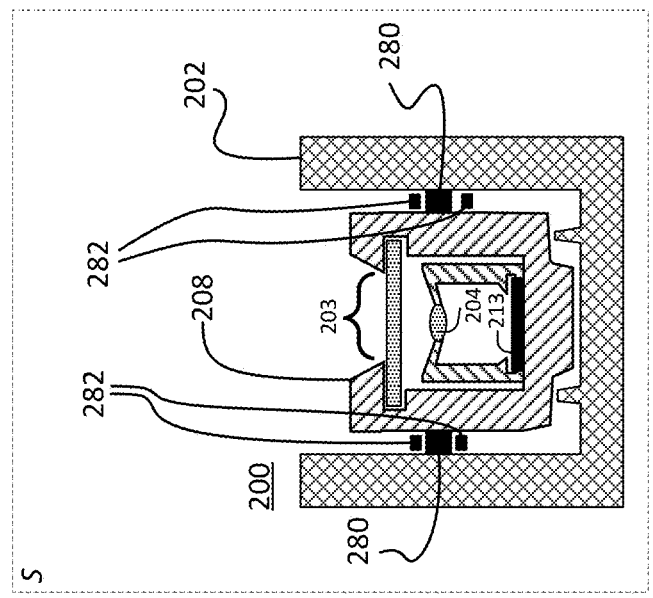
FIG. 2g shows a more detailed representation of a lengthways view of the clip of FIG. 2e.

The second portion may be attached to the first portion by rotation pins 280 in the vicinity of the pivot location. The internal pressures may be provided by torsion springs 282. A lengthwise view of clip 200 through the plane S (S being shown in FIG. 2e) is shown in FIG. 2g. FIG. 2g shows in further detail how the rotation pins 280 and the torsion springs 282 are arranged within the clip 200.

Rotating the second portion causes a torsion in torsion springs 282 as the clip is opened, providing a resistance to the pivoting movement. This torsion acts to close the clip 200 when the external pressures are removed. As viewed in FIG. 2g, the second portion 208 rotates out of the page as the clip is opened—causing torsion in torsion springs 282—and back into the page as the clip is closed, due to torsion in torsion springs 282.

Lens 204 may be supported by an inner casing portion 210a. Inner casing portion 210a may have lips which partially extend over sensor 213, thereby holding sensor 213 in place. Second portion 208 may have crevices supporting transparent element 203, and second portion 208 may have lips which partially extend over transparent element 203a, thereby holding transparent element 203a in place.

As will be appreciated, when the clip 200 is secured to a garment 120 as shown in FIG. 3a and FIG. 3b, the internal pressure and the opposing internal pressure cause an overall attachment force to be applied to the clip 200 which help to ensure that the clip 200 remains secured to the garment 120 (e.g.) even if the garment moves.

Further, in embodiments where the centre of mass 201 located near to the clip-point 201 as detailed above, the clip 200 may be secured to various garments at any desired orientation. Due to the location of the centre of mass, any tendency the clip 200 would otherwise have to rotate about the clip-point 211 in any direction is reduced. That is, not only is any tendency of the clip to tilt towards and/or away from the user reduced, but the tendency of the clip 200 to rotate in any direction perpendicular to the user is also reduced.

In embodiments, opposing surface sections 207,209 on the body and clip portion respectively may have respective recesses and projections which fit together when the clip is closed. For instance, the surface sections may be shaped so as to have respective serrations which interlock or engage when the clip is closed. Alternatives will be envisaged. As will be appreciated, this helps to ensure that the overall attachment force has a magnitude which is sufficient to keep the clip 200 secured to the garment 120, for instance even when the garment 120 is moving.

In embodiments, the battery 216 may be charged via port 220. The port may also be used to establish a connection with an electronic device such as a Personal Computer (PC) using a suitable electronic cable (or similar external connector). This connection may be used to access the memory of the clip 200. This could be achieved using techniques which are known in the art. The connection may be used to not only to transfer images and/or videos from the memory of clip 200 to the electronic device, but also to selectively remove images and/or videos the memory.

In embodiments, port 220 may be a Universal Serial Bus (USB) port although it will be appreciated that other types of port may be used.

In embodiments, the operational circuitry 214 may comprise wireless communication circuitry (not shown) which enables images to be transmitted over an air interface.

The wireless communication circuitry may be capable of establishing wireless connections according to one or more wireless protocols. In embodiments the wireless circuitry may be capable of establishing a first type of connection according to a first wireless protocol, for instance Bluetooth, and a second type of wireless connection according to a second wireless protocol, for instance Wifi, the second type of connection having a higher maximum transmission speed than the first type of connection. A first connection may be established according to the first wireless protocol if the second type of connection is unavailable. The first connection may then be used to transmit a first version of an image or video. When the device is subsequently able to establish a second connection according to the second wireless protocol, the second connection may be used to transmit a second version of the image or video having a higher quality than the first version. The transmitted image may be received by an electronic device, for instance an electronic device such as a PC, tablet device and/or smartphone (not shown) and/or a remote electronic device such as a server.

The camera may be operated by the user with physical buttons on the clip itself. Alternatively or additionally, the camera may be operated via a separate electronic device, such as a smart phone.

In embodiments, the first portion, which houses the operational circuitry 214, may be encased in a water-resistant wall.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A garment clip housing a camera, the clip comprising:
a first portion housing operational circuitry of the camera; and
a second portion supporting an image capture component of the camera, the image capture component connected to the operational circuitry and the second portion having a mass which is less than the first portion, the first and second portions connected in a configuration such that when the clip is secured to the garment the image capture component faces outwardly and the first portion is at least partially concealed by the garment.

2. A garment clip according to claim 1, the image capture element comprising at least one lens and at least one sensor for converting light into electrical signals, the sensor connected to the operational circuitry.

3. A garment clip according to claim 2, the second portion having an opening in an outwardly facing surface thereof and an inwardly extending connection part housing the lens such that the lens faces outwardly through the opening.

4. A garment clip according to claim 3, the second portion having a transparent element which covers the opening, thereby forming a transparent window through which the lens can capture an image.

5. A garment clip according to claim 4, wherein the transparent element and/or the lens are set back into the outward facing surface of the second portion.

6. A garment clip according to claim 5, wherein the transparent element is set back by a distance sufficient to prevent fingers touching the lens when the clip is attached to a garment.

7. A garment clip according to claim 5, in combination with a front plate attached to the attachment means.

8. A garment clip according to claim 3, wherein the connecting part is received by a receiving component of the first portion such that the connecting part is capable of pivoting movement about a pivot location of the clip to alter the disposition of the clip between an open and closed position.

9. A garment clip according to claim 2, wherein the operational circuitry includes processing circuitry connected to receive sensed image data from the image sensor.

10. A garment clip according to claim 1, wherein an inwardly facing surface of the second portion has a first mating region adapted to engage with a second mating region of an opposing surface of the first portion when the clip is in a closed position.

11. A garment clip according to claim 10, wherein the first and second mating regions engage at a clip point and wherein the centre of mass of the clip is located in the vicinity of the clip point to resist a tendency to rotate.

12. A garment clip according to claim 1, wherein the second portion comprises attachment means for supporting a detachable front-plate.

13. A garment clip according to claim 1, the first portion and the second portion being connected such that the second portion can be rotated towards and/or away from the first portion.

14. A garment clip according to claim 1, the first portion having a volume which is larger than the second portion and the first portion having a surface area which is larger than the second portion.

15. A garment clip according to claim 1, the first portion being heavier than the second portion.

16. A camera having a camera module housed in a clip portion of a garment clip, wherein the camera module has a lens for capturing an image, the lens facing through an opening of the clip portion, and wherein the clip portion is pivotably mounted to a body portion which houses operational circuitry connected to the camera module, the camera module configured to pivot with the clip portion.

17. A camera according to claim 16, comprising a detachable front piece attached to an outer surface of the clip portion and covering the outer surface of the clip portion, exposing the opening.

18. A camera according to claim 17 wherein the clip portion overlies only a part of the body portion in a clip position, the body portion intended to be concealed by a garment when the camera is secured to the garment.

19. A camera according to claim 16, wherein the clip portion is forward of the body portion such that the camera has a centre of gravity behind the clip portion to prevent the camera from tilting forwards when the camera is secured to a garment.

20. A camera comprising:
a camera module housed in a clip portion of a garment clip, the camera module comprising a lens for capturing an image, the lens facing through an opening of the clip portion, and the clip portion pivotably mounted to a body portion which houses operational circuitry connected to the camera module, wherein the clip portion overlies only a part of the body portion in a clip position, the body portion intended to be concealed by a garment when the camera is secured to the garment, the camera module configured to pivot with the clip portion.

* * * * *